United States Patent [19]

Stramel

[11] Patent Number: 5,028,481

[45] Date of Patent: Jul. 2, 1991

[54] ELECTRICALLY CONDUCTIVE PIGMENTARY COMPOSITES

[75] Inventor: Rodney D. Stramel, Edmond, Okla.

[73] Assignee: Kerr-McGee Chemical, Oklahoma City, Okla.

[21] Appl. No.: 422,240

[22] Filed: Oct. 16, 1989

[51] Int. Cl.[5] .......................... B32B 5/16; B32B 15/08

[52] U.S. Cl. .................................... 428/323; 428/402; 428/407; 428/461

[58] Field of Search ............... 428/265, 461, 403, 404, 428/407, 323; 525/185; 252/500; 429/213; 357/8; 427/121

[56] References Cited

U.S. PATENT DOCUMENTS

| | | | |
|---|---|---|---|
| 4,204,216 | 5/1980 | Heeger et al. | 357/8 |
| 4,222,903 | 9/1980 | Heeger et al. | 252/500 X |
| 4,521,450 | 6/1985 | Bjorklund et al. | 427/121 |
| 4,604,427 | 8/1986 | Roberts et al. | 525/185 |
| 4,617,228 | 10/1986 | Newman et al. | 428/265 |
| 4,780,246 | 10/1988 | Naarmann | 252/500 |
| 4,795,687 | 1/1989 | Suzuki et al. | 429/213 |
| 4,803,096 | 2/1989 | Kuhn et al. | 252/500 X |

*Primary Examiner*—Thomas J. Herbert, Jr.
*Attorney, Agent, or Firm*—Herbert M. Hanegan; John P. Ward

[57] ABSTRACT

The present invention relates to electrically conductive pigmentary composites comprised of electrically non-conductive pigmentary metal oxide substrates to which is adhered an electrically conductive polymer material.

13 Claims, No Drawings

ELECTRICALLY CONDUCTIVE PIGMENTARY COMPOSITES

FIELD OF THE INVENTION

The present invention relates to electrically conductive pigmentary materials. More particularly, the present invention relates to electrically conductive pigmentary composites comprised of a substrate material consisting of an electrically nonconductive inorganic metal oxide and, adhered to the substrate material, an electrically conductive polymer.

BACKGROUND OF THE INVENTION

Electrically conductive pigmentary materials have, in general, been known for some time. Such pigmentary materials include both those materials which are inherently electrically conductive, as well as those materials which normally are electrically nonconductive but which have been surface treated in a manner to render them electrically conductive. Examples of the inherently electrically conductive materials include the various pigmentary carbon blacks such as, for example, lamp black, furnace black, channel black, thermal black, acetylene black, graphite, and the like. Examples of the normally electrically nonconductive materials include pigmentary inorganic metal and metalloid oxides such as titanium dioxide, silica, alumina and the like, which have been surface treated with a material such as gold or silver or antimony doped tin oxide to render these materials electrically conductive. Powders of the above pigmentary materials have been employed in the past to produce a variety of electrically conductive fibers and fabrics produced therefrom as is discussed in U.S. Pat. No. 4,803,096 issued Feb. 7, 1989. However, according to this patent, when employing such powders, the amount of powder required may be relatively high in order to achieve any reasonable conductivity and this high level of filler may adversely affect the properties of the resulting fibers.

In addition to the use of the above described electrically conductive powders, the above referenced patent also discloses the use of certain electrically conductive polymeric materials, namely, poly(pyrrole) and poly(aniline) to impart electrical conductivity to fibers, films and fabrics manufactured from various synthetic polymers which are known insulating materials or, at best, semiconductors. Techniques disclosed by this patent for imparting electrical conductivity to such fibers, films and fabrics include impregnating films and fibers with, for instance, pyrrole and an oxidant and thereafter subjecting the pyrrole to chemical oxidation polymerization conditions or by incorporating an oxidant catalyst into a fiber composite and thereafter exposing the fiber composite to pyrrole in solution or vapor form or by precipitating conductive polypyrrole in the interstitial pores of porous fabrics such as, for example, fiberglass fabric.

SUMMARY OF THE INVENTION

The present invention relates to electrically conductive pigmentary materials and more particularly to electrically conductive pigmentary composites comprising a substrate material consisting of an electrically nonconductive pigmentary metal oxide and, adhered to the surface of said substrate material, an electrically conductive polymer material.

The electrically conductive pigmentary composites of the present invention preferably comprises those composites wherein the pigmentary substrate material consists of those electrically nonconductive metal oxides in which the metal constituent thereof is selected from Groups IIA, IIIA, IVA and IVB of the Periodic Table of the Elements and wherein the electrically conductive polymer material adhered to said pigmentary substrate material comprises at least one chemical oxidation polymerized homopolymer or copolymer derived from at least one cyclic monomeric material selected from the group consisting of pyrrole, thiophene and aniline monomers and substituted derivatives or analogues thereof. Broadly, the amount of the electrically conductive polymer material adhered to the substrate material will range from about 0.1 to about 50 percent by weight based on the total weight of the pigmentary composite. The adherence of these amounts of the conductive polymer material to the pigmentary substrate material provides pigmentary composites having electrical conductivities ranging from about $1\times10^{-10}$ to about $1\times10^{2}$ ohm $^{-1}$ cm$^{-1}$.

DETAILED DESCRIPTION OF THE INVENTION

As briefly mentioned above, the electrically conductive pigmentary composites of the present invention broadly consist of composite materials comprising a substrate material consisting of an electrically non-conducting pigmentary inorganic metal oxide and which pigmentary inorganic metal oxide substrate has adhered thereto an electrically conductive polymer as hereinafter described. In general, the substrate material can comprise any electrically nonconductive inorganic metal oxide which heretofore has found use as a pigment, filler, extender, or the like in a wide variety of applications. Typically, however, the electrically nonconductive inorganic metal oxides useful as the substrate material in the pigmentary composites of this invention are those inorganic metal oxides in which the metal constituent thereof is a metal selected from Groups IIA, IIIA, IVA and IVB of the Period Table of the Elements. Representative, but nonlimiting, examples of the metal constituent in these inorganic metal oxides include, for instance, strontium, titanium, zirconium, aluminum, gallium, silicon, germanium and the like. The preferred substrate materials are those inorganic metal oxides in which the metal constituent is titanium, silicon or aluminum as represented by the metal oxides titania (or titanium dioxide), silica and alumina.

A particularly preferred electrically nonconductive inorganic metal oxide for use as a substrate material in the electrically conductive pigmentary composites of the present invention is pigmentary titanium dioxide and especially titanium dioxide having the rutile crystalline structure. As is known, titanium dioxide, whether of the anatase or rutile crystalline structure, is the single most important white used in modern industrial applications which include paints, paper and paper coatings, plastics, rubber, flooring, and the like.

Regardless of the particular electrically nonconductive inorganic metal oxide employed as the substrate material in the electrically conductive pigmentary composites of the present invention, such inorganic metal oxides will be pigmentary in size. Thus, the inorganic metal oxide substrate typically will comprise particles or crystallites which range in size from about 0.1 to about 0.4 micron and preferably from about 0.2 to about 0.3 micron.

Broadly, the electrically nonconductive inorganic metal oxides comprising the substrate materials in the electrically conductive pigmentary composites of this invention will comprise from about 50 to about 99.9 percent by weight of the total weight of said pigmentary composites. However, particularly good electrical conductivities have been observed in those pigmentary composites in which the inorganic metal oxide substrate materials comprise from about 90 to about 99 percent by weight of the total weight of the composites.

As mentioned hereinabove, the electrically conductive pigmentary composites of this invention further comprise, in addition to the substrate material of pigmentary inorganic metal oxide, an electrically conductive polymer material adhered to the surface of said substrate material. This electrically conductive polymer material can comprise any one of a number of known electrically conductive organic polymer materials which, in general, are characterized by possessing conjugated double bonds and radical ions along the backbone or main chain of said polymer materials. These polymer materials further can be characterized by optionally containing counter or dopant ions in association with said radical ions.

In general, the electrically conductive organic polymer material possessing the above mentioned characteristics will typically comprise those organic polymers prepared by chemical oxidation polymerization of five- and six-member cyclic monomers selected from the group consisting of pyrrole, thiophene, aniline and the substituted derivatives or analogues thereof. The substituted derivatives or analogues include both carbon and nitrogen position substituted pyrrole and aniline monomers and carbon position substituted thiophene monomers. The substituted pyrrole, aniline and thiophene derivatives or analogues include those pyrrole, aniline and thiophene compounds having one or more alkyl, alkoxy, aryl, aryloxy, amino, alkylamino or arylamino substituent groups. Representative, but nonlimiting, examples of the derivatives or analogues of said pyrrole, thiophene and aniline monomers useful in preparing the electrically conductive pigmentary composites of this invention include, for instance, carbon position substituted pyrroles such as 2-methylpyrrole, 2-ethylpyrrole, 2-isopropylpyrrole, 3-methylpyrrole, 3,4-dimethylpyrrole, 3,5-dimethylpyrrole, 3-n-butoxypyrrole, 2-phenylpyrrole, 3-tolypyrrole, 3-methoxypyrrole, 3-phenoxypyrrole, 3-aminopyrrole, 3-diethylaminopyrrole and the like; nitrogen position substituted pyrroles such as N-methylpyrrole, N-phenylpyrrole, N-methyl-3-methylpyrrole methyl-3-methylpyrrole and the like; carbon position substituted aniline monomers such as methylaniline, n-propylaniline, phenylaniline, aminoaniline, diphenylaminoaniline, methylphenylamino aniline and the like; nitrogen position substituted aniline monomers such as N-methylaniline, N,N-dimethyl-aniline, N-isopropylaniline, ethylbenzylaniline and the like and carbon position substituted thiophene monomers such as 3-methyl-thiophene, 3-n-buthylthiophene, 2-methoxythiophene, 3-n-butoxythiophene, 3-phenylthiophene, 3-amino-thiophene, 2-dimethylaminothiophene, 3-phenylaminothiophene and the like. Of the above disclosed representative cyclic organic polymer materials suitable for use as the adherent outer shell or film of the pigmentary composites of the present invention, the unsubstituted pyrrole and unsubstituted aniline monomers are preferred.

The above pyrrole, thiophene and aniline monomers and substituted derivatives or analogues thereof can be polymerized utilizing any of the chemical oxidants which are known to effect the polymerization and production of electrically conductive polymers, including chemical oxidants containing metal ions capable of changing their valences. Broadly, these chemical oxidants will include any of the various metallic and nonmetallic containing compounds as disclosed in U.S. Pat. Nos. 4,204,216; 4,222,903, 4,521,450; 4,604,427; 4,617,228; 4,780,246; 4,795,687; and 4,803,096 the teachings of which, as they relate to such chemical oxidants, are incorporated herein in their entirety by reference. Representative, but nonlimiting, examples of metallic chemical oxidants include compounds of polyvalent metal ions such as, for instance, $FeCl_3$, $Fe_2(SO_4)_3$, $K_3[Fe(CN)_6]$, $Ce(SO_4)_2$, $CrO_3$, $H_3PO_4 \bullet 12MoO_3$, $CuCl_2$, $AgNO_3$ and the like. Among such compounds, the ferric ion containing compounds are preferred. Nonmetallic chemical oxidants suitable for use in preparing the electrically conductive pigmentary composites of the present invention include such compounds as nitrates, quinones, peroxides, peracids, persulfates, perborates, permanganates, perchlorates, chromates and the like. Representative examples of these nonmetallic oxidants include nitric acid, 1,4-benzoquinone, hydrogen peroxide, peroxyacetic acid, ammonium persulfate, ammonium perborate and the like. Additionally, alkali metal salts, such as sodium, potassium and lithium salts of the aforementioned nonmetallic chemical oxidants also can be employed.

In general, when any of the above mentioned nonmetallic chemical oxidants is employed to effect the polymerization of the herein described five- and six-membered cyclic monomer materials, it also is preferred to utilize a counter or dopant ion in conjunction with said nonmetallic oxidant. In this regard, various counter ions can be used including, for instance, iodide, chloride and perchlorate ions. These ions are available from such sources as elemental iodine ($I_2$), hydrochloric acid (HCl) and hydrogen perchlorate ($HClO_4$). Other useful counter or dopant ions include sulfate ($So_4^{2-}$), bisulfate ($HSO_4^-$), perchlorate ($ClO_4^-$), fluoroborate ($BF_4^-$), hexafluorophosphate ($PF_6^-$), hexafluoroarsenate ($AsF_6^-$) and hexafluoroantimonate ($SbF_6^-$), and the like. Examples of compounds capable of providing such counter or dopant ions include, for example, sulfuric acid, sodium sulfate, sodium bisulfate, sodium perchlorate, ammonium fluoroborate, hydrogen hexafluoroarsenate and the like.

Certain materials, useful in polymerizing the cyclic monomer materials described above can operate not only to provide the oxidant function, but also to provide the counter or dopant ions. Representative, but nonlimiting, examples of such dual purpose materials are fluoroborates and the like.

With respect to preparation of the pigmentary composites of the present invention, it has been found that such preparation readily can be carried out utilizing aqueous slurries of the pigmentary inorganic metal oxide substrate materials. Broadly, such slurries will contain from about 1 to about 50 percent by weight of the pigmentary metal oxide substrate material suspended in the aqueous medium based on the total weight of the slurry and preferably from about 10 to about 35 percent by weight. In a preferred embodiment of this invention, wherein the pigmentary metal oxide substrate material is pigmentary rutile titanium dioxide prepared by the well known vapor phase oxidation of titanium tetrachloride, said slurry can conveniently comprise an "in-process" slurry stream resulting from the wet milling and hydroclassification of raw titanium dioxide product. By the term "raw titanium dioxide product" is meant milled and classified pigmentary titanium dioxide the surface of which, however, is free of any hydrous metal oxide coating such as silica. Typically, such in-process slurry streams will contain from about 20 to about 35 percent by weight of said raw titanium dioxide based on the total weight of said slurry stream.

In general, the chemical oxidant materials described above can be added to the aqueous slurries of the pigmentary metal oxide substrate materials as such or in the form of aqueous solutions. When employed as aqueous solutions, typically the concentration of the chemical oxidant materials in such solutions will range from about 0.001 to about 2.0 molar and preferably from about 0.05 to about 1.2 molar. When the particular chemical oxidant material employed is a nonmetallic oxidant, the aqueous oxidant solutions further can contain the counter or dopant ion source in addition to said chemical oxidant material. In this aspect of the invention, a sufficient amount of said counter or dopant ion source will be incorporated in the aqueous oxidant solutions to provide therein a counter or dopant ion concentration of from about 0.002 to about 4.0 molar and preferably from about 0.05 to about 1.2 molar. In another aspect of the present invention, such counter or dopant ion source also can be employed in the form of aqueous dopant solutions separate and apart from said aqueous chemical oxidant solutions. In such event, these separate dopant solutions will contain the same concentrations of the counter or dopant ion source as disclosed above.

The amount of the above described aqueous oxidant solutions to be added to the aqueous slurries containing the substrate material, i.e., the suspended inorganic pigmentary metal oxide, can vary widely. Typically, the amounts of said aqueous oxidant solutions added will be amounts sufficient to provide, in the aqueous slurries, from about 0.1 to about 5.0 mols and preferably from about 0.2 to about 3.0 mols of the chemical oxidant material per mol of the cyclic monomer material to be polymerized and deposited upon the pigmentary metal oxide material contained in said slurries.

In general, the amounts of the herein disclosed polymerizable cyclic monomers added to the aqueous slurries containing the pigmentary inorganic metal oxide substrate material also can vary over a wide range. Typically, however, the amounts of the cyclic monomers employed will be an amount sufficient to provide from about 0.1 to about 50 percent by weight and preferably from about 1 to about 10 percent by weight of the total weight of the composite product of electrically conductive polymer material deposited upon and adhered to the pigmentary inorganic metal oxide substrate material.

In preparing the pigmentary composite materials of the present invention, the order of addition of the cyclic monomer materials, the chemical oxidant materials and the compounds capable of providing the counter or dopant ions to the aqueous slurry of suspended pigmentary metal oxide materials is not critical. Thus, the cyclic monomer material can first be added to the aqueous slurry followed by addition of the chemical oxidant material or the chemical oxidant material can first be added to the aqueous slurry followed by addition of the cyclic monomer material. When utilized, the counter or dopant ion containing compound also can be added to the aqueous solution either before, after or contemporaneously with the addition of either of the chemical oxidant material or cyclic monomer material. Also, as disclosed hereinabove, the counter or dopant ion containing compound can be combined with the chemical oxidant material, in which case it will be added to the aqueous slurry simultaneously with the chemical oxidant material.

In addition to the chemical oxidant materials, cyclic monomer materials and, optionally, the counter or dopant ion compounds introduced into the aqueous slurry of pigmentary metal oxide substrate materials, auxiliary acids may also be added to the aqueous slurry to provide a catalytic effect for the chemical oxidation polymerization process. Such auxiliary acids can include, for example, sulfuric acid, hydrochloric acid, acetic acid and the like. When such auxiliary acids are employed, generally they will be employed in amounts in the range of from about 1 to about 100 mols per mol of the chemical oxidant added.

The deposition and polymerization of the cyclic monomer materials upon the pigmentary metal oxide substrate materials in the aqueous slurries will be readily carried out at ambient temperatures. Broadly, however, the deposition and polymerization will be carried out at temperatures of from about 0° C. to about 100° C. with preferred temperatures being in the range of from about 4° C. to about 30° C. Deposition and polymerization times required at these temperatures will generally range from about 0.1 to about 24 hours and preferably from about 1 to about 12 hours.

The following examples are presented for purposes of illustration only and are not intended to limit, in any sense, the scope of the present invention.

EXAMPLE 1

To an open glass reaction vessel equipped with a motor driven agitator was added 183 ml of water, 37 ml (0.51 mol) of concentrated (98 wt%) sulfuric acid and 50 g (0.626 mol) of wet milled rutile $TiO_2$ pigment prepared by the vapor phase oxidation of titanium tetrachloride. The resulting slurry, containing a $TiO_2$ solids content of about 25 percent by weight, was cooled to a temperature of about 23° C. To this cooled slurry then was added, with stirring, 2.9 g (0.011 mol) of solid potassium persulfate and 0.25 g (0.003 mol) of aniline. Reaction of the resulting mixture was allowed to proceed for a period of 12 hours. At the end of this time the mixture was filtered and the recovered pigmentary composite product, comprised of 98 percent by weight of $TiO_2$ as the substrate material and 2.0 percent by weight of polyaniline as the electrically conductive polymer material adhered thereto, was washed with distilled water and dried at a temperature of 50° C. for a period of 24 hours.

In order to determine the conductivity of this pigmentary composite product, 0.2 g of the composite product was compressed into a cylindrical pellet under a pressure of 1800 psi (126.5 kg/cm$^2$) and the pellet subjected to testing utilizing a digital multimeter. The conductivity of the pigmentary composite product was determined to be $4\times10^{-4}$ ohm $^{-1}$ cm$^{-}$.

EXAMPLE 2

Utilizing an open glass reaction vessel similar to that employed in Example 1 and equipped with a motor driven agitator, a slurry was prepared comprised of 50 g (0.626 mol) of the same pigmentary $TiO_2$ used in Example 1 and 220 ml of water. The pH of this slurry, which contained a $TiO_2$ solids content of 22 percent by weight, was adjusted to a pH of 1.5 by the addition thereto of approximately 4 ml (0.043 mol) of concentrated sulfuric acid. After cooling the slurry to a temperature of about 23° C., 14.5 g (0.054 mol) of solid potassium persulfate and 5.0 g (0.054 mol) of aniline were added. Agitation of the resulting slurry mixture was continued for a period of 12 hours to allow for complete deposition and polymerization of the aniline monomer upon the pigmentary $TiO_2$. The reacted slurry mixture was filtered and the recovered pigmentary composite product washed with distilled water and finally dried for 24 hours at 50° C.

The conductivity of the above prepared composite product, consisting of 94 percent by weight of rutile $TiO_2$ as the substrate material and 6 percent by weight of polyaniline as the electrically conductive material adhered thereto, again was determined utilizing a compressed pellet comprising about 0.2 g of the composite product. The conductivity of this particular composite product was found to be $6.5\times10^{-2}$ ohm$^{-1}$ cm$^{-1}$.

EXAMPLE 3

A further pigmentary composite material of the present invention was prepared as follows: A slurry comprised of 25 g (0.313 mol) of wet milled rutile $TiO_2$ produced by the vapor phase oxidation of $TiCl_4$ and 68 ml of water was formed in a glass reaction vessel. This slurry then was divided into two equal portions. To one portion was added 2.5 g (0.037 mol) of pyrrole and to the other portion was added 30.5 g (0.120 mol) of solid iron perchlorate. Each portion was cooled to a temperature of 0° C. and recombined in the reaction vessel to form a single mixture. The mixture was allowed to warm to a temperature of 23° C. over a period of 12 hours. During this period the mixture was maintained under continuous agitation. At the end of this period. the mixture was filtered and the recovered composite product washed with distilled water and the washed product dried at a temperature of 50° C. for 24 hours.

As in the preceding examples, the dried product, consisting of 90 percent by weight of rutile $TiO_2$ as the substrate material and 10 percent by weight of polypyrrole as the electrically condutive material adhered thereto, was compressed into a cylindrical pellet (containing 0.2 g of the product) and tested to determine the electrical conductivity of this product. The electrical conductivity of the composite product of this Example was found to be $4.5\times10^{-1}$ ohm$^{-1}$ cm$^{-1}$.

EXAMPLE 4

To a 55 gallon (208.2 l.) stirred reactor was introduced 2268 g of the pigmentary $TiO_2$ described in the above Examples, 167 l. of water and 833 ml of concentrated (36 percent by weight) hydrochloric acid, the latter for purposes of aiding in the stabilization of the resulting slurry. The preparation of the slurry was carried out at ambient temperatures of about 23° C. To this slurry was added, with stirring, 227 g of pyrrole. Agitation of the pyrrole containing slurry was continued for 15 minutes, at which time an aqueous solution of 1260 g of anhydrous ferric chloride dissolved in 5 l. of water was introduced into the stirred slurry over a period of five minutes. Agitation of the resulting mixture was continued for an additional one hour, at which time the mixture was filtered, the recovered pigmentary composite product washed with distilled water and then thoroughly dried at a temperature of 110° C. The dried composite product, consisting of 93 percent by weight of $TiO_2$ as the substrate material and 7 percent by weight of polypyrrole as the electrically conductive material adhered thereto, produced in this Example exhibited an electrical conductivity of $2\times10^{-1}$ ohm$^{-1}$ cm$^{-1}$.

EXAMPLE 5

A further electrically conductive pigmentary composite of the present invention was prepared as follows: in a five gallon (19 l.) reaction vessel, 850 g of a wet milled rutile $TiO_2$ pigment was slurried in 5 l. of water. To this slurry was added 500 g of solid ferric chloride hexahydrate. Stirring of the slurry containing this oxidant was continued for 0.5 hour to ensure that the oxidant was completely dissolved. At the end of this time, 67.1 g of pyrrole were added to the slurry and the mixture allowed to react, under continued agitation, for an additional one hour. The reacted mixture was finally filtered and the recovered pigmentary composite product, consisting of 94 percent by weight of pigmentary rutile $TiO_2$ as the substrate material and 6 percent by weight of polypyrrole as the electrically conductive material adhered thereto, washed with distilled water and dried at a temperature of 110° C. Testing of pellets of the composite product in the form and manner disclosed in the Examples above revealed this product to possess an electrical conductivity of 1.0 ohm$^{-1}$ cm$^{-1}$.

The above Examples are illustrative of the preparation of electrically conductive pigmentary composites of the present invention utilizing various oxidants either in their solid form or as solutions dissolved in an aqueous medium, e.g. water. The resulting pigmentary composite products exhibit an enhanced electrical conductivity particularly when compared to that of the substrate materials upon which they are based and which substrate materials, i.e. the aforementioned pigmentary inorganic metal oxides and particularly pigmentary rutile titanium dioxide, typically are characterized by their essential nonconductive or insulating properties. Because of the electrically conductive nature of the pigmentary composite materials of this invention, they find use in a wide variety of applications such as pigments and fillers in paints, plastics and the like, as well as in the manufacture of various electrical and/or electronic components such as, for instance, electrodes, solar cells, electromagnetic absorbing devices and the like.

While the electrically conductive pigmentary composite materials of the present invention have been described in terms of what is believed to be the preferred embodiments, it is to be understood that changes and modifications can be made thereto without departing from the scope and spirit thereof.

What is claimed is:

1. An electrically conductive pigmentary composite comprising:

(a) a finely divided electrically nonconductive pigmentary metal oxide substrate material and (b) an electrically conductive polymer material adhered to the surface of said substrate material in an amount sufficient to provide an electrically conductive pigmentary composite having an electrical conductivity in the range of from about $1\times10^{-10}$ to about $1\times10^{2}$ $ohm^{-1}$ $cm^{-1}$.

2. The composite of claim 1 wherein said substrate material has a particle size in the range of from about 0.1 to about 0.4 micron.

3. The composite of claim 1 wherein said substrate material comprises from about 50 to about 99.9 percent by weight of the total weight of said composite.

4. The composite of claim 1 wherein the metal constituent of said metal oxide is selected from Group IIA, IIIA, IVA, or IVB of the Periodic Table of the Elements.

5. The composite of claim 4 wherein said metal oxide is titanium dioxide.

6. The composite of claim 1 wherein said electrically conductive polymer material adhered to said substrate material is produced by the chemical oxidation polymerization of cyclic monomers selected from the group consisting of pyrrole, thiophene, aniline, substituted derivatives of pyrrole, thiophene and aniline, and mixtures thereof.

7. The composite of claim 6 wherein said substituted derivatives comprise pyrrole, thiophene and aniline substituted in the carbon position with alkyl, alkyoxy, aryl, aryloxy, amino, alkylamino or arylamino groups and in the nitrogen position with alkyl or aryl groups.

8. The composite of claim 6 wherein said electrically conductive polymer material adhered to said substrate material comprises from about 0.1 to about 50 percent by weight of the total weight of said composite.

9. An electrically conductive pigmentary composite comprising:

(a) a finely divided electrically nonconductive pigmentary titanium dioxide substrate material in an amount in the range of from about 50 to about 99.9 percent by weight, based on the total weight of said pigmentary composite, and (b) an electrically conductive polymer material produced by the chemical oxidation polymerization of cyclic monomers selected from the group consisting of pyrrole, thiophene, aniline, substituted derivatives of pyrrole, thiophene and aniline, and mixtures thereof, said electrically conductive polymer material being adhered to the surface of said titanium dioxide substrate material in an amount in the range of from about 0.1 to about 50 percent by weight, based on the total weight of said pigmentary composite, so that said pigmentary composite has an electrical conductivity in the range of from about $1\times10^{-5}$ to about $1\times10^{2}$ $ohm^{-1}$ $cm^{-1}$.

10. The composite of claim 9 wherein said titanium dioxide substrate material comprises from about 90 to about 99 percent by weight of the total weight of said pigmentary composite.

11. The composite of claim 9 wherein said titanium dioxide substrate material has a particle size in the range of from about 0.2 to about 0.3 micron.

12. The composite of claim 9 wherein said electrically conductive polymer material is a pyrrole homopolymer.

13. The composite of claim 12 wherein said pyrrole homopolymer comprises from about 1 to about 10 percent by weight of the total weight of said pigmentary composite.

* * * * *